Figure 1:
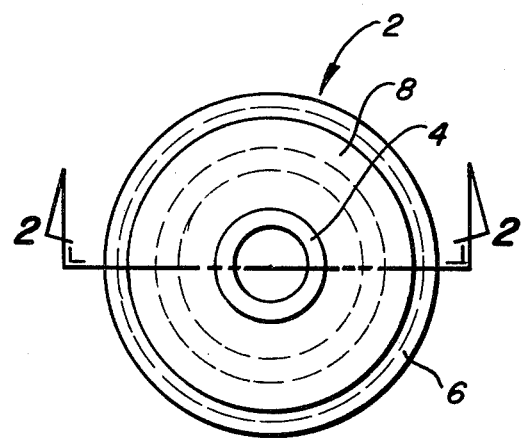

United States Patent [19]

Burk et al.

[11] 4,316,643
[45] Feb. 23, 1982

[54] VEHICLE SUSPENSION BUSHING

[75] Inventors: Michael D. Burk, Logansport, Ind.; Gary L. Hipsher, Pompano Beach, Fla.; Gregory M. Nicoles, Logansport, Ind.

[73] Assignee: The General Tire & Rubber Co., Akron, Ohio

[21] Appl. No.: 133,729

[22] Filed: Mar. 25, 1980

[51] Int. Cl.³ .............................................. F16C 27/06
[52] U.S. Cl. .................................. 308/26; 308/237 R; 403/225
[58] Field of Search ............. 308/26, 237 R; 403/221, 403/222, 223, 224, 225, 226, 227, 228; 280/95 R; 267/63 R, 63 A

[56] References Cited

U.S. PATENT DOCUMENTS

| | | | |
|---|---|---|---|
| 2,324,997 | 7/1943 | Brown | 403/224 X |
| 2,851,314 | 9/1958 | Thomson | 308/26 |
| 3,288,500 | 11/1966 | Hamel | 403/225 X |
| 4,139,246 | 2/1979 | Mikosihiba et al. | 308/26 |

FOREIGN PATENT DOCUMENTS 455444 3/1950 Italy .................................... 403/221

Primary Examiner—William D. Martin, Jr.

[57] ABSTRACT

A vehicle suspension bushing that is constructed of an inner metal member, an outer metal member, and an elastomeric member inserted between the metal members has an improved construction that increases the bushing's axial rate, or resistance to axial deflection, and decreases its radial rate, or resistance to radial deflection. The main features of the improvement are circumferentially extending slots in the outer surface of the elastomeric member, located adjacent each end of the member, and inwardly extending flanges on the ends of the outer member that fit into the slots in the elastomeric member.

2 Claims, 2 Drawing Figures

U.S. Patent  Feb. 23, 1982  4,316,643

VEHICLE SUSPENSION BUSHING

This invention relates to bushings designed particularly for vehicle suspension systems. Such bushings are commonly constructed of a tubular inner metal member, a tubular metal outer member, and an annular elastomeric member inserted between the metal members.

The elastomeric member of the bushing permits parts of a suspension system that are connected respectively to the inner metal member and the outer metal member to move toward and away from each other in the radial direction with respect to the bushing axis. Preferably, the elastomeric member is designed to permit a large deflection in the radial direction, so that large loads, or shocks, can be absorbed by the elastomeric material without damaging the surrounding metal parts. However, such deflection is not desired in the axial direction, because this deflection causes axial spreading and consequent misalignment of the suspension system parts, and tends to weaken the mechanical bond between the compressed elastomeric member and inner and outer metal members between which the elastomeric member is sandwiched.

Were it not for other considerations, the radial deflection rate of the bushing could be easily increased by selecting a composition for the elastomeric material that has a low resistance to load at least at the low end of the load deflection curve. Alternatively, the radial rate can be adjusted by providing voids in the elastomeric material. In fact, bushings have been designed having different radial rates in different radial directions, by the use of properly placed voids, and sometimes by filling voids with a fluid or a second elastomeric material having a different spring rate. Examples of such dual radial rate bushings are found in U.S. Pat. Nos. 3,082,999; 3,147,964; and 3,698,703, all owned by the assignee of the present invention. However, one problem with such adjustments in the radial rate, of the bushing, particularly when the object is to decrease the average radial rate of the bushing, is that the axial rate is usually decreased as well. This is because adjustments in elastomeric composition or the use of voids to decrease the spring rate of a material lowers the spring rate in all directions, not simply the desired direction.

An object of the present invention is to provide an improved bushing for vehicle suspension systems that not only exhibits a decreased radial rate, but actually increases the axial rate of the bushing at the same time, thus providing a bushing with both good radial force absorbing characteristics and a high resistance to axial spreading and misalignment of the suspension system parts.

To accomplish the foregoing, the bushing of the present invention includes a tubular rigid inner member, a tubular rigid outer member surrounding the tubular inner member, and an annular elastomeric member inserted between the inner and outer rigid members for absorbing loads created by relative movement between the inner and outer rigid members. The bushing is characterized by the elastomeric member having in its outer surface two axially spaced, circumferentially extending slots and by the outer rigid member having a radially inwardly extending flange on each end protruding into each of the slots in the elastomeric member and retaining the elastomeric material axially adjacent the slots to increase the resistance of the bushing to relative axial movement between the inner and outer rigid members, while offering a relatively low resistance to radial movement between the rigid members.

Figure 2:
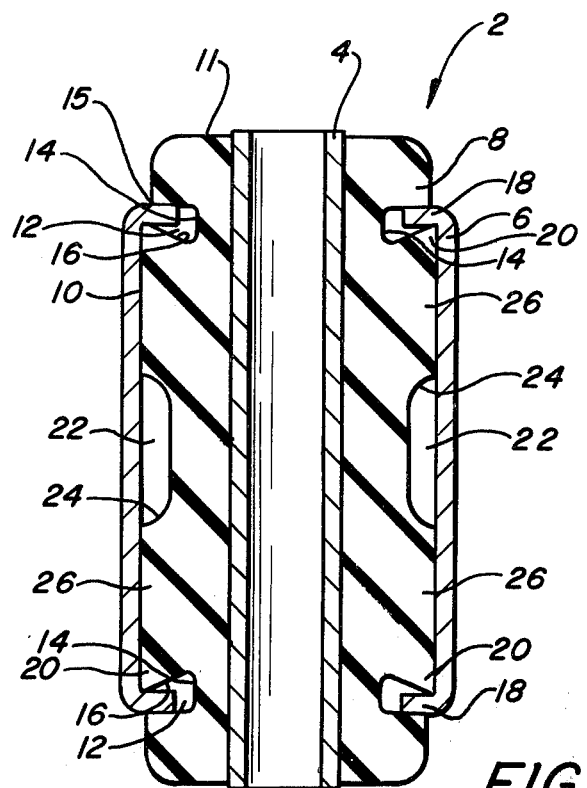

These and other objects and features of the present invention will be more apparent from the following detailed description and the attached drawings, in which:

FIG. 1 is an end view of a bushing illustrating one embodiment of my invention; and FIG. 2 is a longitudinal section of the bushing of FIG. 1, taken along line 2—2 of FIG. 1.

The bushing 2 has a tubular inner member 4 and a surrounding tubular outer member 6. Both the inner member 4 and the outer member 6 are made of a rigid material, preferably a metal such as steel. Inserted between the members 4 and 6 is an annular elastomeric member 8, preferably made of rubber. The elastomeric member 8 has an outer surface 10 and end surfaces 11. As with most suspension system bushings of this kind, the elastomeric member 8 is stretched over the inner member 4 and is compressed when the outer member 6 is pressed over its outer surface 10.

Two axially spaced slots 12 in the outer surface 10 extend circumferentially around the elastomeric member 8. Each of the slots 12 has a base surface 14, a mouth 15, and an axially inward wall 16 that is canted so that it extends axially toward end surfaces 11 of the elastomeric member 8 and makes an acute angle with the outer surface 10 at the mouth 15 of the slot.

The outer rigid member 6 has at its ends inwardly extending flanges 18 that fit into the slots 12. The engagement of the flanges 18 with the elastomeric material adjacent the slots 12 makes the bushing 2 more resistant to axial deflection. The triangular portions 20 of elastomeric material, created by the preferred canting of the walls 16 of the slots 12, are resistant to axial compression; yet they bend radially inwardly under radial compression, and help lower the radial load/deflection rate of the bushing.

The flanges 18 protruding into the slots 12 also keep the elastomeric member 8 firmly fixed in both axial directions with respect to the outer member 6. With bushings of conventional constructions, relying on surface roughness of the outer member and compression of the elastomeric member against the outer member, the elastomeric member is prone to slipping with respect to the outer member after long and hard use.

Since the flanges 18 make the bushing 2 less dependent on fictional engagement to hold the outer member 6 from moving axially with respect to the elastomeric member 8, a third slot or void 22 may be put in the middle of the outer surface 10 of the elastomeric member 8 without appreciably altering the axial deflection characteristics of the bushing 2. The slot 22 has axially outwardly canted walls 24 that together with the outwardly canted walls 16 of slots 12 form parallelogram-shaped portions 26 of the elastomeric member 8 that tend to collapse radially inwardly under radial loads, yet due to the containment of these bodies 26 between the flanges 18 of the outer member 6, they are highly resistant to axial deflection.

With the flanges 18, the outer members 6 can be more difficult to assemble over the elastomeric member 8. However, if the slots 12 are provided with canted walls 16 and slots 22 are employed with canted walls 24, the lowered resistance to radial deflection provided by these features will also be of advantage during the assembly of the bushing 2. The parallelogram-shaped portions 26 will tend to collapse radially as one of the flanges 18 is slipped over them during the assembly operation. However, once the outer member 8 is in place with the flanges 18 inserted in their respective slots 12 in the elastomeric member 8, the triangular portions 20 will resist bending in the radially outward direction and will thereby resist any forces tending to remove the flanges 18 from the slots 12.

Thus, the bushing 2, with the slots 12 in its elastomeric member 8 and flanges 18 of the outer member 6 that protrude into the slots 12, has a low radial load/deflection rate, but achieves a high axial load/deflection rate desired for bushings used in vehicle suspension systems. In addition, these load/deflection rates are improved further by the canted walls 20 of the slots 12 and the slot 22 with its canted walls 24.

While only one embodiment of the present invention has been shown and described, other embodiments, modifications, and additions to the basic invention will be apparent to those skilled in the art, without departing from the scope of the appended claims.

We claim:

1. A vehicle suspension bushing including a tubular rigid inner member, a tubular rigid outer member surrounding said tubular inner member, and an annular elastomeric member inserted between said inner and outer rigid members for absorbing loads created by relative movement between said inner and outer rigid members, said bushing characterized by:
   (1) said elastomeric member having in its outer surface two axially spaced circumferentially extending slots;
   (2) said outer rigid member having a radially inwardly extending flange on each end protruding into each of said slots and retaining the elastomeric material axially adjacent said slots to increase the resistance of said bushing to relative axial movement between said inner and outer rigid members, while offering a relatively low resistance to radial movement between said rigid members; and
   (3) the axially inward lateral walls of said slots being canted so as to extend from the base surfaces of said slots axially toward the ends of the elastomeric member and make acute angles with the outer surface of the elastomeric member at the mouths of said slots.

2. The bushing according to claim 1 characterized further by a third slot in said outer surface extending circumferentially around the axially central portion of said elastomeric member, and having axially outwardly canted sidewalls to reduce the resistance of said bushing to relative radial movement between said inner and outer rigid members.

* * * * *